(12) United States Patent
Shiraishi et al.

(10) Patent No.: US 6,292,043 B1
(45) Date of Patent: Sep. 18, 2001

(54) SEMICONDUCTOR INTEGRATED CIRCUIT DEVICE

(75) Inventors: Junya Shiraishi; Michio Komoda, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/453,795

(22) Filed: Dec. 3, 1999

(30) Foreign Application Priority Data

Jul. 19, 1999 (JP) ................................................ 11-204788

(51) Int. Cl.$^7$ ........................................................ H03K 3/00
(52) U.S. Cl. ............................................. 327/295; 327/565
(58) Field of Search .................................. 327/295, 293, 327/297, 291, 565

(56) References Cited

U.S. PATENT DOCUMENTS

| 3,510,546 | 5/1970 | Wentzell | 75/340 |
|---|---|---|---|
| 4,372,823 | 2/1983 | Church et al. | 205/64 |
| 4,487,651 | 12/1984 | Wang | 117/81 |
| 4,722,763 | 2/1988 | Pa et al. | 117/81 |
| 5,430,397 | * 7/1995 | Itoh et al. | 327/297 |
| 5,926,053 | * 7/1999 | McDermontt et al. | 327/298 |
| 6,043,704 | * 3/2000 | Yoshitake | 327/565 |

FOREIGN PATENT DOCUMENTS

| 51-104533 | 9/1976 | (JP) . |
|---|---|---|
| 57-182972 | 11/1982 | (JP) . |
| 61-133560 | 6/1986 | (JP) . |
| 1-289155 | 11/1989 | (JP) . |
| 3-71559 | 3/1991 | (JP) . |
| 5-233092 | 9/1993 | (JP) . |
| 6-112205 | 4/1994 | (JP) . |
| 7-134626 | 5/1995 | (JP) . |
| 7-240468 | 9/1995 | (JP) . |

OTHER PUBLICATIONS

Patent Abstracts of Japan, vol. 007, No. 027 (E–156), Feb. 3, 1983 (JP 57 182972A1).
Patent Abstracts of Japan, vol. 010, No. 325 (E–451), Nov. 6, 1986 (JP 61 133560A).
Database WPI, Section CH, Week 7644, Derwent Publications Ltd., London GB, Class L03, AN 76–82092X (JP 51 104533), Sep. 16, 1976.
Database WPI, Section CH, Week 9119, Derwent Publications Ltd., London GB, Class A85, AN 91–135563 (JP 03 071559, Mar. 27, 1991.
A. Lawley, *Atomization: The Production of Metals* (Metal Powders Industries Federation 1992), pp. 4–9, 20–27, 34–37, 40–44, 74–93, 102–107, and 113–129.

* cited by examiner

*Primary Examiner*—Tuan T. Lam
*Assistant Examiner*—Linh Nguyen
(74) *Attorney, Agent, or Firm*—Burns, Doane, Swecker & Mathis, LLP

(57) ABSTRACT

In a semiconductor integrated circuit device, a clock buffer is arranged at the center of a chip by using a core I/O technique for arranging an input/output buffer at an arbitrary position. A clock is wired such that, with reference to a wire extending to a circuit in a chip which is farthest from the clock buffer and must be synchronously controlled. Wires extending to the other circuits are intentionally bypassed to make wires extending to all the circuits electrically equal to each other in length. Thus, a skew of a clock can be suppressed due to the isometric wiring.

6 Claims, 7 Drawing Sheets

SEMICONDUCTOR INTEGRATED CIRCUIT DEVICE

FIELD OF THE INVENTION

The present invention relates to a semiconductor integrated circuit device formed on the assumption that synchronous design should be performed. More particularly, this invention relates to a semiconductor integrated circuit device and a clock wiring control method that realize the supply of optimum clock signals by controlling a clock skew.

BACKGROUND OF THE INVENTION

A conventional semiconductor integrated circuit device will be described below. For example, in a semiconductor integrated circuit device such as an LSI (Large Scale Integrated circuit), it is necessary to supply synchronized clock signals to cells such as flip-flops which are laid out on a chip as a whole on the assumption that synchronous design should be performed. This is necessary to prevent an erroneous operation caused by a delay or influence caused by hazard from a combination circuit. More particularly, as a scale and speed of a circuit increases, the precision in the synchronization is regarded as more important.

However, inside the LSI, when clock signals are supplied by a clock buffer and wires, different transmission delays sometimes occur according to the load or wire length of a circuit which is connected in the downstream side. More specifically, as shown in a clock driver circuit in FIGS. 5A and 5B as an example, when single clock signals subjected to buffering by a clock buffer are distributed to, e.g., a plurality of FF (Flip-Flops) shown in a drawing (see FIG. 5A) through clock buffers of a plurality of stages, the clock signal reaches a cell while the clock has a skew (clock skew) caused by the number of stages of the clock buffers and a wire length (see FIG. 5B). When the clock signal has an excessive skew, then a malfunction which accompanies such a skew occurs in the LSI.

Therefore, in the design of an LSI, it is very important to suppress a skew within the range in which a correct operation is performed in order to prevent the malfunction and to adapt to increase in the scale or the speed of a circuit.

FIG. 6 shows an example of the configuration of a conventional LSI. In FIG. 6, reference numeral 101 represents an LSI. The LSI 101 comprises a clock buffer 2, a data input/output buffer 3, a clock input PAD 4, a data input/output PAD 5, a CPU core unit 6, an FPU unit 7, a first random logic unit 8, a second random logic unit 9 and a memory unit 10.

In this LSI 101, a clock signal is input through the clock input PAD 4 and the clock buffer 2 arranged in a peripheral section. In addition, wires are intentionally bypassed to suppress a skew, and wiring control of the clock is performed such that wires extending to all the constituent units are electrically equal to each other in length. In this manner, the supply of a clock signal with a small skew is realized.

FIG. 7 is a chart showing an example of a clock wiring control method in a conventional LSI. This LSI is different from that shown in FIG. 6. In the conventional LSI of FIG. 7, a clock signal is input through a clock input PAD 4 and a clock buffer 2 arranged in a peripheral section, and the clock signals are distributed to respective constituent units by wires extended in the form of a mesh. In this manner, a clock signal having an averaged uniform transmission delay can be input to each of the constituent units, and a skew can be suppressed.

Thus, in the conventional semiconductor integrated circuit device, isometric wiring is performed such that wires extending from the clock buffer 2 to respective blocks are made equal to the length of a wire extending from the clock buffer 2 to the farthest block, so that the clock signal is supplied to each of the constituent units while a skew is suppressed.

However, in the clock wiring control method of the conventional semiconductor integrated circuit device, since the wire extending from the clock buffer to the farthest block is used as a reference, although a skew can be decreased, a transmission delay in the circuit as a whole disadvantageously increases because a length of the wire extending from the clock buffer to a nearer block is long.

In addition, since the wire which extends from the clock buffer to the farthest block is used as a reference, the layout of clock wiring becomes complex. More particularly, a wiring path extending from the clock buffer to the relatively nearer blocks becomes complex. It is disadvantageously difficult to perform wiring control of a clock.

SUMMARY OF THE INVENTION

The present invention has been made in light of the problems described above. It is an object of the present invention to obtain a semiconductor integrated circuit device and a clock wiring control method in which a skew of a clock signal is suppressed by isometric wiring. It is also an object of the present invention to obtain a semiconductor integrated circuit device in which, wire lengths of a clock are shortened by making the arrangement of a clock buffer changeable, so that optimum clock signals can be supplied to circuits for performing synchronous control.

According to a first aspect of the present invention, since the clock subjected to buffering has wires extending from the central section of a chip in a first step, even if wiring control is performed such that, with reference to a wire extending from the clock buffer to the farthest circuit, isometric wiring is performed to all the remaining circuits, the lengths of the wires extending to the circuits are about ½ of the length of a conventional wire. In addition, when the lengths of the wires extending to the circuits are about ½ of the length of a conventional wire, a wiring path extending from the clock buffer to a relatively near block is considerably simplified in comparison with a conventional wiring path. Therefore, redundant wiring decreases, and wiring control of the clock becomes simple.

Further, by using redundant wiring which is decreased such that the arrangement regions of the circuits which must be synchronously controlled have a multi-stage configuration, a layout made by isometric wiring is easily obtained by trials which are smaller in number than those of the conventional semiconductor integrated circuit device. Similarly, a reduction in chip area is realized because of the elimination of the redundant wiring. In addition, all clock drivers are short-circuited to each other, so that a clock skew is suppressed at a high precision.

According to a second aspect of the present invention, outputs from the clock drivers distributed to circuits which must be synchronously controlled are made uniform, so that a clock skew is suppressed at a higher precision.

According to a third aspect of the present invention, wires of a clock subjected to buffering are constituted by wires extending from the central section of a chip due to a first step. Therefore, even if wiring control is performed such that, with reference to a wire extending from a clock buffer to the farthest circuit, isometric wiring is performed to all the remaining circuits, the lengths of the wires extending to the circuits are about ½ of the length of a conventional wire. In addition, when the lengths of the wires extending to the circuits are about ½ of the length of a conventional wire, a wiring path extending from the clock buffer to a relatively near block is considerably simplified in comparison with a conventional wiring path. Therefore, redundant wiring decreases, and wiring control of the clock becomes simple.

Further, a redundant wiring which is decreased such that the arrangement regions of the circuits which must be synchronously controlled have a multi-stage configuration is obtained in a third to fifth steps. Therefore, a layout made by isometric wiring is easily obtained by trials which are smaller in number than those of the conventional semiconductor integrated circuit device. Similarly, a reduction in chip area is realized because of the elimination of the redundant wiring. Further, in the sixth step, all clock drivers are short-circuited to each other, so that a clock skew is suppressed at a high precision.

According to a fourth aspect of the present invention, outputs from a clock drivers distributed to circuits which must be synchronously controlled are made uniform. Therefore, a clock skew is suppressed at a higher precision.

Other objects and features of this invention will become apparent from the following description with reference to the accompanying drawings.

DESCRIPTION OF THE PREFERRED EMBODIMENTS

Embodiments of a semiconductor integrated circuit device and a clock wiring control method according to the present invention will be described below with reference to the drawings. The present invention is not limited to these embodiments.

Figure 1:
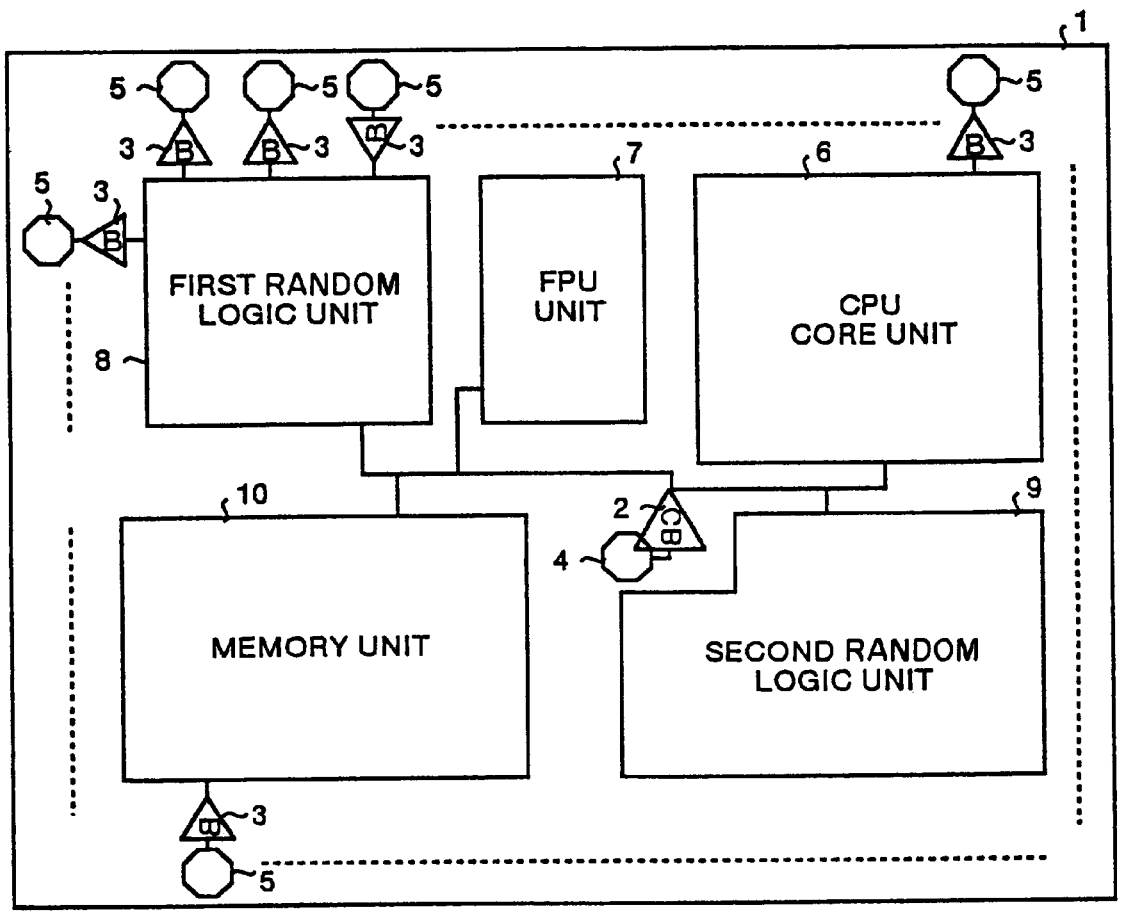
FIG. 1 is a block diagram showing the configuration of a semiconductor integrated circuit device according to the present invention and an example of a clock wiring control method according to a first embodiment of the present invention.

FIG. 1 is a block diagram showing the configuration of a semiconductor integrated circuit device and an example of a clock wiring control method according to a first embodiment of the present invention. In FIG. 1, reference numeral 1 represents a concrete example of a semiconductor integrated circuit, e.g., an LSI (Large Scale Integrated circuit). The LSI 1 comprises a clock buffer 2, a data input/output buffer 3, a clock input PAD 4, a data input/output PAD 5, a CPU core unit 6, an FPU unit 7, a first random logic unit 8, a second random logic unit 9 and a memory unit 10. In this LSI 1, the respective blocks of the CPU core unit 6, the FPU unit 7, the first random logic unit 8, the second random logic unit 9, and the memory unit 10 shown in FIG. 1 are subjected to synchronous control.

In this LSI 1, by using a core I/O technique, the clock buffer 2 and clock input pad 4 are arranged at a position which is not limited to the periphery of the device. More specifically, in this embodiment, the clock buffer 2 is arranged at, e.g., the center of a chip. Therefore, in the LSI according to this embodiment, clock signals are input to the blocks through the clock input PAD 4 and the clock buffer 2 which are arranged at the central section.

In addition, in the present embodiment, in a similar manner as the conventional method, wires are intentionally bypassed, and wiring control of a clock is performed such that wires extending to all the blocks have electrically equal length in order to suppress a skew. However, unlike the conventional LSI 101 that has the clock buffer 2 at the periphery of the chip, in the LSI 1 according to this embodiment, a clock subjected to buffering has wires extending from the central section of the chip. Therefore, even if wiring control is performed such that, with reference to a wire extending to the farthest block, isometric wiring is performed to the remaining blocks, the lengths of the wires extending to the blocks are about ½ of the length of a conventional wire.

In this manner, in a clock wiring control method in the semiconductor integrated circuit device according to this embodiment, since isometric wiring is performed with reference to a wire extending from the clock buffer 2 arranged at the central section of the chip to the farthest block, a skew decreases. In addition, since the length of the wire extending to the block farthest from the clock buffer 2 is about ½ of the length of a conventional wire, a transmission delay of the circuit as a whole can be reduced.

As described above, since the length of the wire extending to the block farthest from the clock buffer is about ½ of the length of a conventional wire, the layout of the clock wiring becomes simple. More specifically, a wiring path extending from the clock buffer to a relatively near block is considerably simplified in comparison with a conventional wiring path, and wiring control of the clock becomes easy.

According to this embodiment, a clock skew can be suppressed by isometric wiring, and the arrangement of the clock buffer is made changeable to shorten the lengths of the wires of the clock. Therefore, optimum clock signals can be supplied to the circuits which are synchronously controlled.

Figure 2:
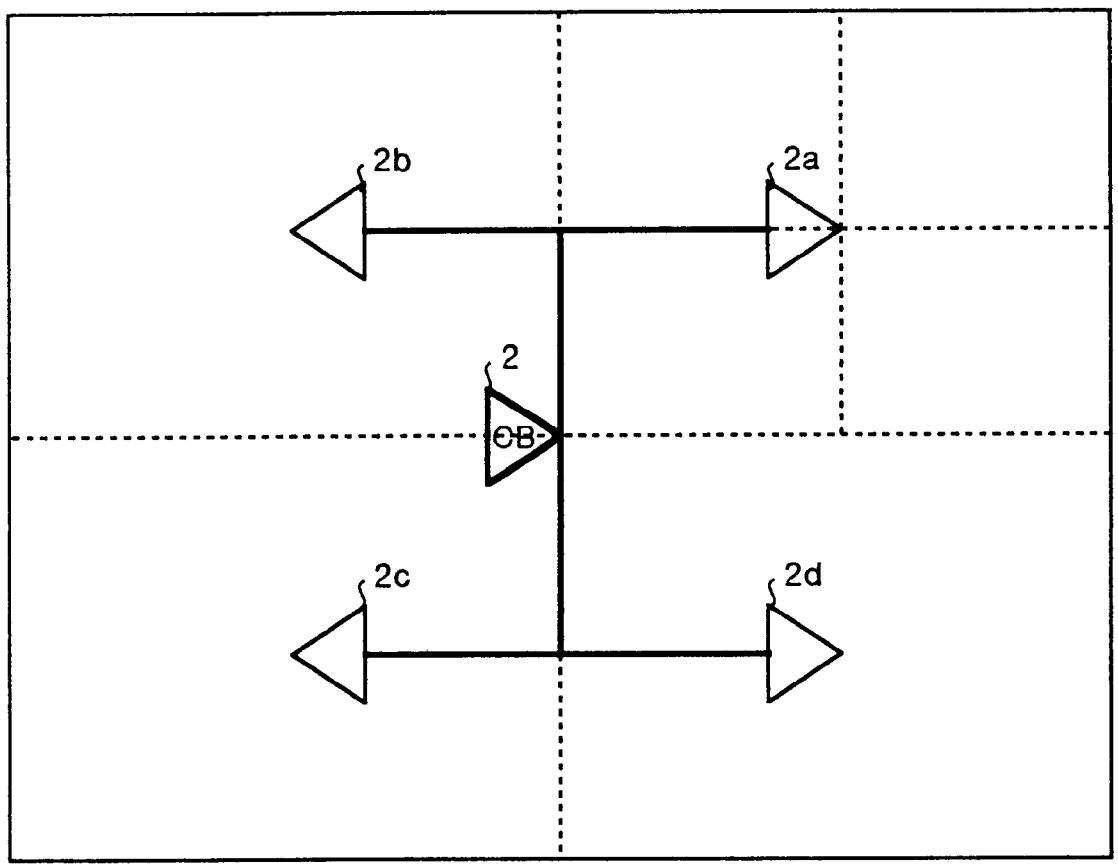
FIG. 2 is a diagram showing an example of a clock wiring control method according to a second embodiment of the present invention.

FIG. 2 is a diagram showing an example of a clock wiring control method according to a second embodiment of the present invention. The same configuration as that shown in FIG. 1 described above is used as the configuration of blocks and a clock buffer 2 which constitute a semiconductor integrated circuit device. Therefore, in this embodiment, as described above, it is assumed that the clock buffer 2 is arranged at the central section of a chip.

For example, when isometric wiring is performed by a conventional method, as described in the first embodiment, a wiring layout is attempted plural times with reference to the length of a wire from the clock buffer to the farthest block, and a wiring path supposed to be optimum is determined. However, when the wiring length is used as a reference, the layout of wires extending from the clock buffer to relatively near blocks becomes complex. Therefore, redundant wiring occurs, and wiring control of the clock becomes difficult.

In the clock wiring control method according to the second embodiment, an arrangement region of cells which are synchronously controlled is uniformly divided into four regions about the clock buffer 2, clock drivers 2a, 2b, 2c, and 2d corresponding to the second stage are arranged at the center in each divided regions, respectively. Each of the arrangement regions of the cells are divided into four regions about each of the clock drivers 2a, 2b, 2c, and 2d, and clock drivers corresponding to the third stage are arranged at the center in each divided regions, respectively. Subsequently, by the same manner as described above, clock drivers corresponding to the fourth stage, the fifth stage, . . . , are arranged. In the second embodiment, an arrangement region of cells is divided into four regions about the clock buffer 2 and a clock driver. However, the configuration is not to be limited to this, but a configuration in which an arrangement region is divided into n (n is an integer which is two or more) regions is also applicable.

By executing the clock wiring control method described above, in the second embodiment, an arrangement region of cells which are synchronously controlled is divided in advance. Further, regions in which isometric wires are formed can be decreased in size. Therefore, redundant wiring decreases, and the facility of the isometric wiring can be improved.

Figure 3:
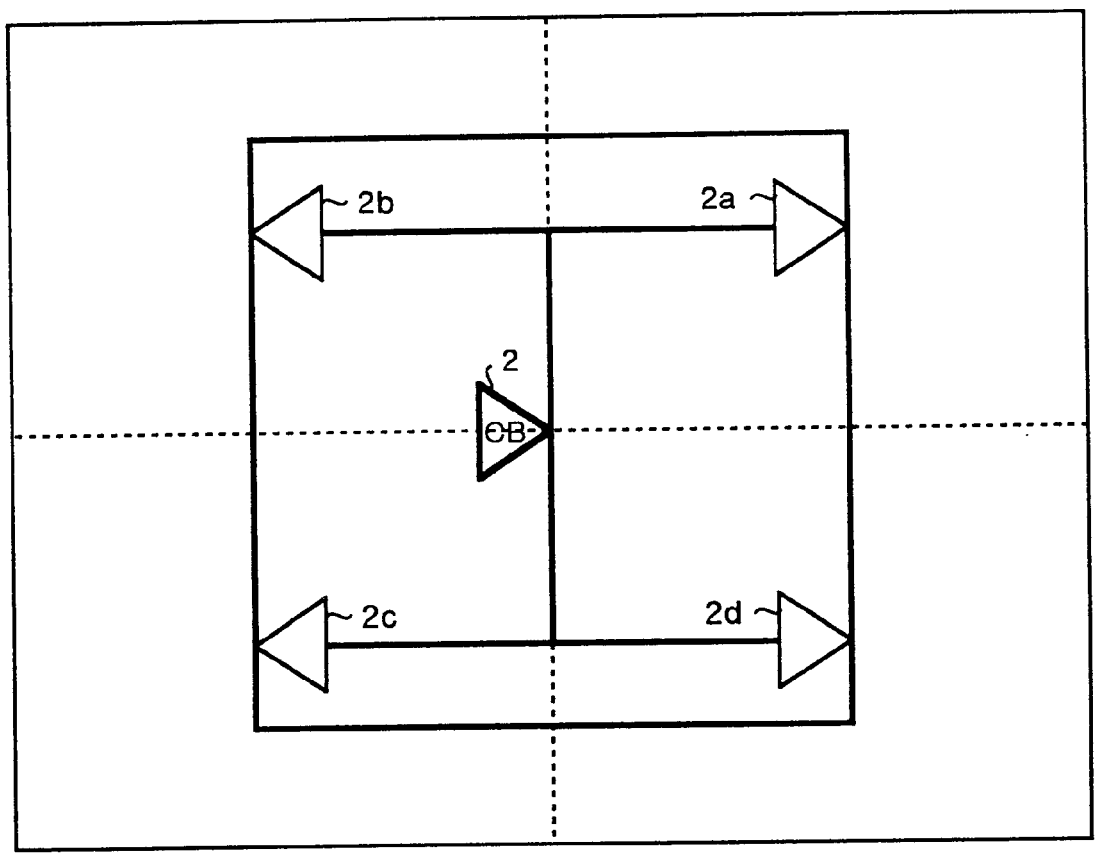
FIG. 3 is a diagram showing a state wherein outputs from clock drivers shown in FIG. 2 are short-circuited in the form of a ring.

In the second embodiment, as described above, in addition to the configuration in which the arrangement region of cells are divided into n regions about a clock buffer or a clock driver, and outputs from clock drivers of a plurality of stages located at the center in each divided regions are short-circuited as shown in FIG. 3. FIG. 3 is a diagram showing a state wherein outputs from the clock drivers shown in FIG. 2 are short-circuited in the form of a ring (this state is called a ring wiring hereinafter).

By executing the clock wiring control method described above, in the second embodiment, output timings of the clock drivers are averaged. Therefore, a clock skew which may be generated every time the number of stages of the clock drivers increases can be suppressed at a high precision.

According to the second embodiment, as in the first embodiment, an advantage based on the core I/O technique can be obtained, and an arrangement region of cells is divided in a multi-stage configuration, so that regions in which isometric wires are formed can be decreased in size. Therefore, according to the second embodiment, since redundant wiring decreases, a reduction in chip area can also be realized.

Furthermore, as described above, when a clock buffer and clock drivers of a plurality of stages are short-circuited, a clock skew can be suppressed at a high precision. Therefore, according to the second embodiment optimum clock signals can be supplied to circuits which are synchronously controlled.

Figure 4:
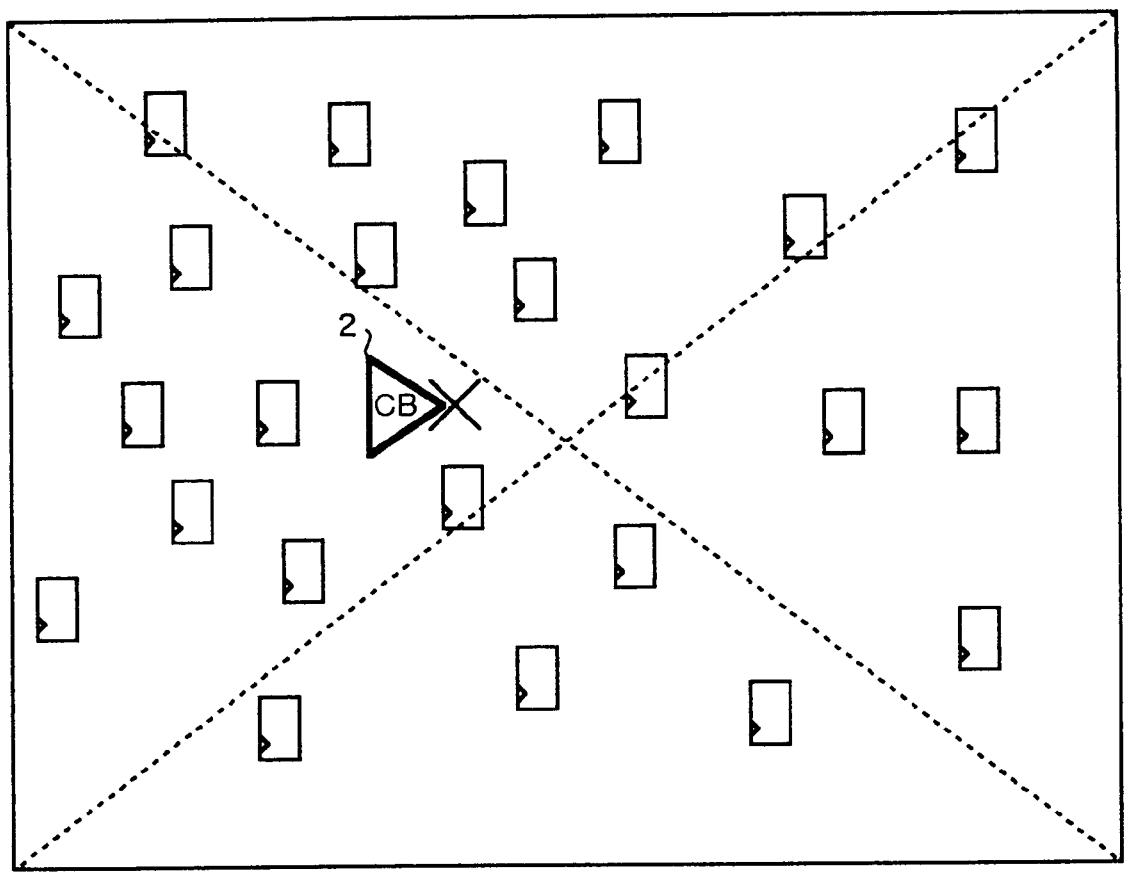
FIG. 4 is a drawing showing an example of a clock wiring control method according to a third embodiment of the present invention.
Figure 5A:
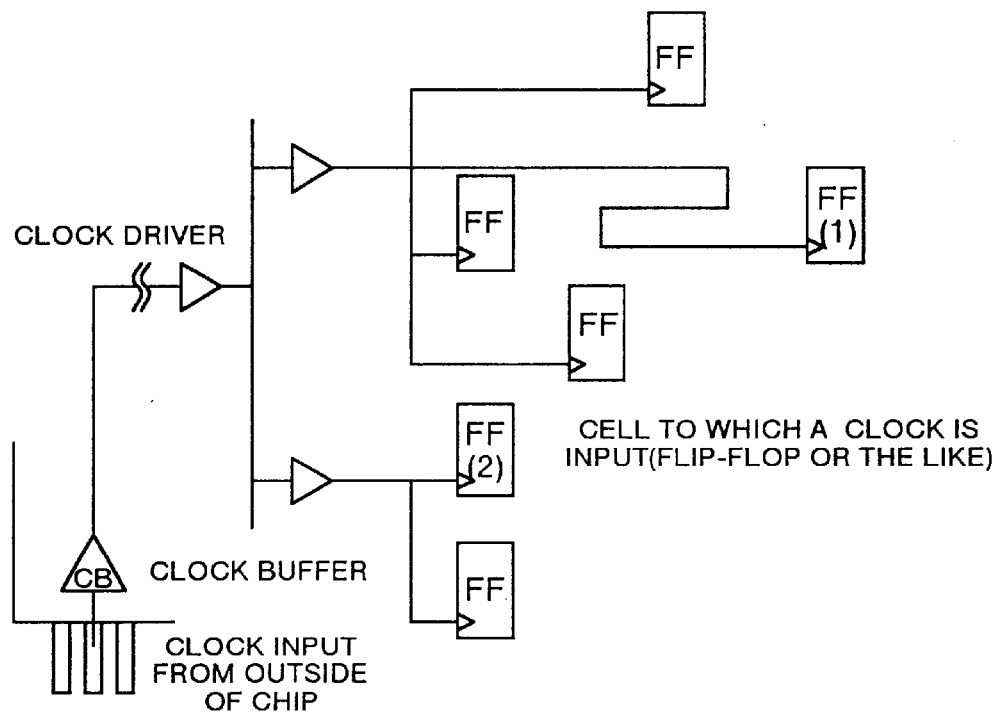
FIG. 5A is a diagram and FIG. 5B is a chart showing an example of a conventional clock driver circuit.
Figure 5B:
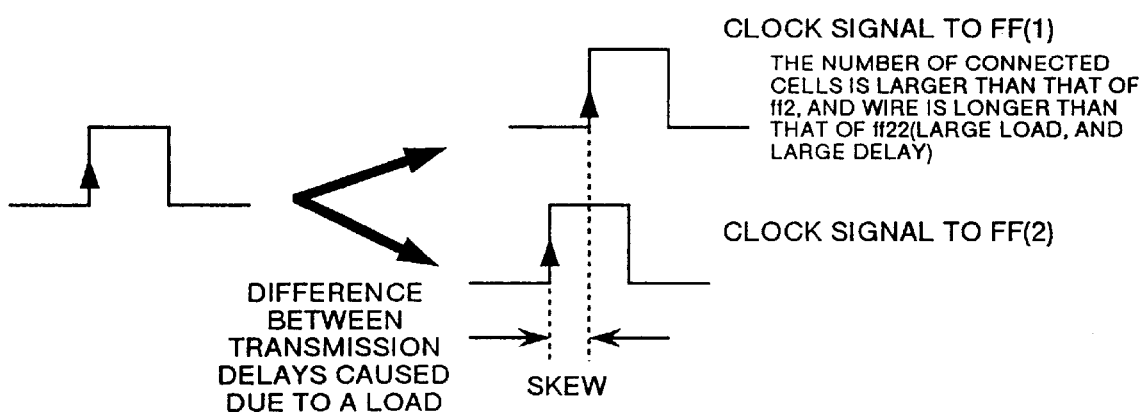
Figure 6:
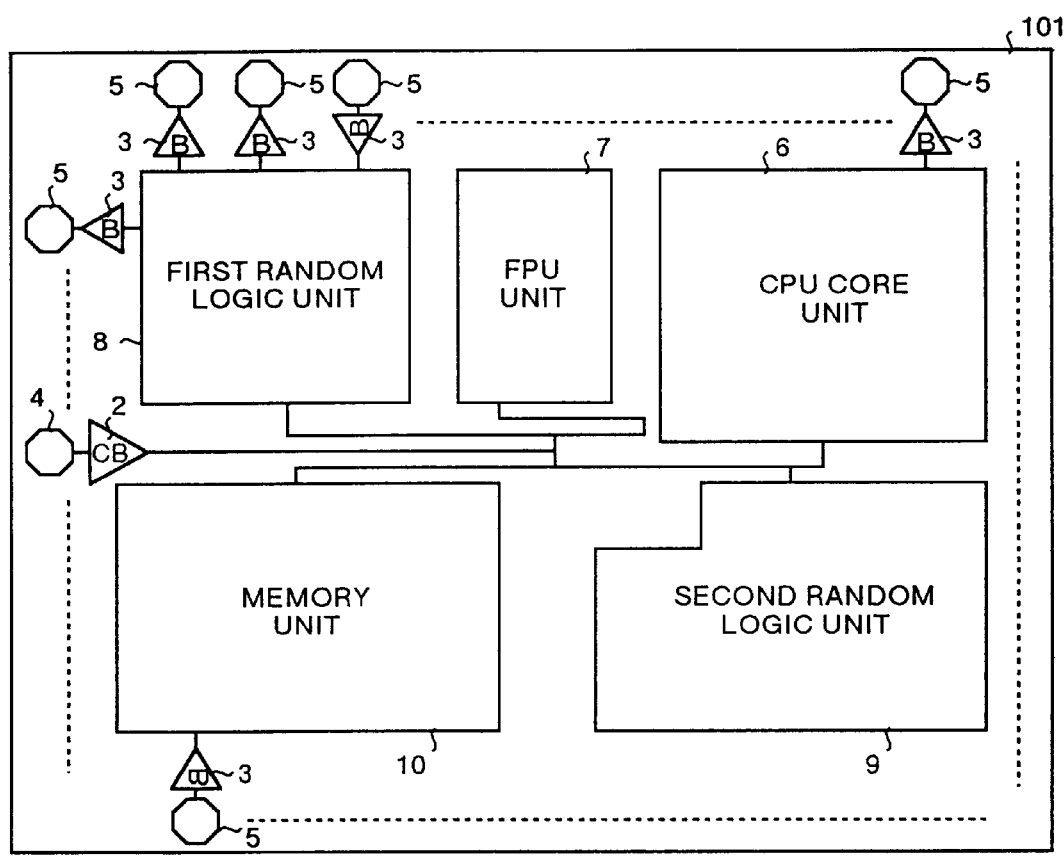
FIG. 6 is a block diagram showing an example of the configuration of a conventional LSI.
Figure 7:
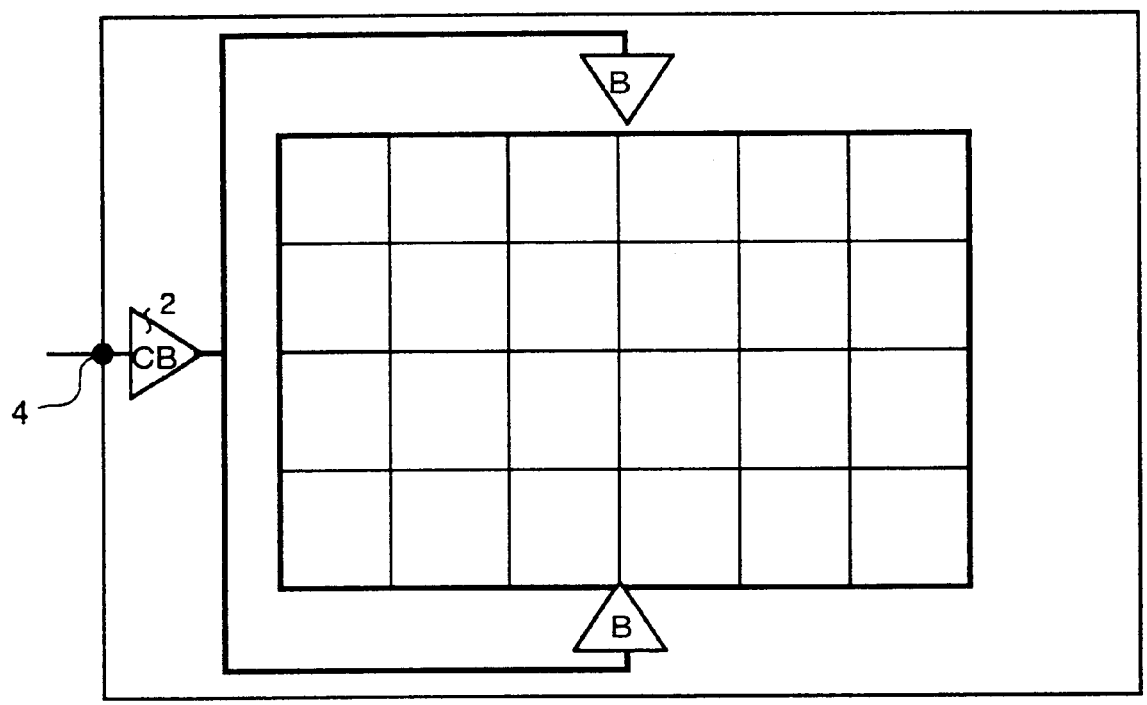
FIG. 7 is a diagram showing an example of a clock wiring control method in a conventional LSI.

FIG. 4 is a diagram showing an example of a clock wiring control method according to a third embodiment of the present invention. As the configuration of blocks constituting a semiconductor integrated circuit device, the same configuration shown in FIG. 1 described above is used. In the third embodiment, in particular, a clock wiring control method used when arrangement positions of circuits (cells) which must be synchronously controlled are bias in a chip will be described below.

For example, as shown in FIG. 4, when cells such as FFs which must be synchronously controlled, and the positions of the cells are bias, in the third embodiment, arrangement information of the cells is collected in advance. The center of gravity of input loads is calculated based on the arrangement information, and a clock buffer is arranged at the position of the center of gravity. In this manner, as described in the first embodiment, even if a chip is constituted by a plurality of blocks, outputs (fan outs) from the clock drivers which supply clock signals to the cells can be uniformed. In this case, as in the first embodiment, wires are intentionally bypassed to suppress a skew, and wiring control of the clock is performed such that wires extending to all the blocks are electrically equal to each other in length.

Therefore, according to the third embodiment, as in the first embodiment, an advantage based on the core I/O technique can be obtained. In addition, outputs from the clock drivers which supply clock signals to the cells are uniformed, so that a clock skew can be suppressed at a high precision. Therefore, according to the third embodiment clock signals each having a higher synchronous precision can be supplied to the cells, respectively.

As described above, with the semiconductor integrated circuit device according to first aspect of the present invention, since a clock subjected to buffering has wires extending from the central section of a chip, even if wiring control is performed such that, with reference to a wire extending from the clock buffer to the farthest circuit, isometric wiring is performed to all the remaining circuits, the lengths of the wires extending to the circuits are about ½ of the length of a conventional wire. In addition, when the lengths of the wires extending to the circuits are about ½ of the length of a conventional wire, a wiring path extending from the clock buffer to a relatively near block is considerably simplified in comparison with a conventional wiring path. Accordingly, redundant wiring decreases, and wiring control of the clock becomes simple. Therefore, a reduction in clock skew and a reduction in transmission delay of the circuit as a whole can be realized, and a semiconductor integrated circuit device which can supply optimum clock signals to circuits which are synchronously controlled can be advantageously obtained.

Further, when arrangement regions of circuits which must be synchronously controlled is constituted by a multi-stage configuration, regions in which isometric wires are formed can be decreased in size. Accordingly, redundant wiring decreases, and a layout made by isometric wiring can be advantageously obtained by trials which are smaller in number than those of the conventional semiconductor integrated circuit device. In addition, since redundant wiring decreases, a reduction in chip area can be advantageously realized. Furthermore, all clock drivers are short-circuited to each other, so that a clock skew is suppressed at a high precision. Therefore, optimum clock signals can be advantageously supplied to the circuits which are synchronously controlled.

With the semiconductor integrated circuit device according to second aspect of the present invention, outputs from the clock drivers which supply clock signals to the cells are uniformed, so that a clock skew can be suppressed at a high precision. Therefore, clock signals each having a higher synchronous precision can be advantageously supplied to the circuits, respectively.

With the clock wiring control method according to third aspect of the present invention, since the wires of the clock subjected to buffering are constituted by wires extending from the central section of the chip due to the first step, even if wiring control is performed such that, with reference to a wire extending from the clock buffer to the farthest circuit, isometric wiring is performed to all the remaining circuits, the lengths of the wires extending to the circuits are about ½ of the length of a conventional wire. In addition, when the lengths of the wires extending to the circuits are about ½ of the length of a conventional wire, a wiring path extending from the clock buffer to a relatively near block is considerably simplified in comparison with a conventional wiring path. For this reason, redundant wiring decreases, and wiring control of the clock becomes simple. Therefore, a clock wiring control method which can realize a reduction in clock skew and a reduction in transmission delay of the circuit as a whole and can supply optimum clocks to the circuits which are synchronously controlled can be advantageously obtained.

Further, in the third to fifth steps, arrangement regions of the circuits which must be synchronously controlled have a multi-stage configuration, so that regions in which isometric wires are formed can be decreased in size. For this reason, redundant wiring decreases, and an advantage that a layout made by isometric wiring is easily obtained by trials which are smaller in number than those of the conventional semiconductor integrated circuit device can be achieved. In addition, since redundant wiring decreases, a reduction in chip area can be advantageously realized. Furthermore, in the sixth step, all clock drivers are short-circuited to each other, so that a clock skew can be suppressed at a high precision. Therefore, optimum clock signals can be advantageously supplied to the circuits which are synchronously controlled.

With the clock wiring control method according to fourth aspect of the present invention, in the first step, outputs from the clock drivers distributed to the circuits which must be synchronously controlled are made uniform, so that a clock skew can be suppressed at a higher precision. Therefore, clock signals each having a synchronous precision can be advantageously supplied to the circuit, respectively.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit device comprising:
    a clock buffer and clock input pad located at a central position of a semiconductor integrated circuit device by using a core I/O technique for arranging an input/output buffer at a position which is not limited to a periphery of the semiconductor integrated circuit device; and
    a clock wired such that, with reference to a wire extending to a circuit in the semiconductor integrated circuit device which is farthest from said clock buffer and is to be synchronously controlled, wires extending to the other circuits which are to be synchronously controlled are intentionally bypassed so as to make the lengths of all of said wires electrically equal to each other.

2. The semiconductor integrated circuit device according to claim 1, further comprising an arrangement region of the circuits which are to be synchronously controlled and are divided into n (n is an integer which is not less than two) regions about the clock buffer,
    at least one first clock driver and clock input pad arranged at a central position relative to the divided regions;
    each of said divided regions of said circuits is divided into n sub-regions about a corresponding said at least one first clock driver;
    second clock drivers arranged at a central position in each divided sub-regions, respectively.

3. A semiconductor integrated circuit device comprising:
    circuits which are to be synchronously controlled;
    a clock buffer;
    a wiring pad which connects said clock buffer to an outside clock by using a core I/O technique; positions of the wiring pad and the clock buffer being at the center of gravity of input loads of said circuits which are to be synchronously controlled; and
    a wiring pattern on said semiconductor integrated circuit device such that, with reference to a wire extending to a circuit in the semiconductor integrated circuit device which is farthest from said clock buffer and is to be synchronously controlled, wires extending to the other circuits which are to be synchronously controlled are intentionally bypassed so as to make the lengths of all of said wires electrically equal to each other.

4. The semiconductor integrated circuit device according to claim 2, wherein said clock drivers are arranged by the same procedure as described above in a multi-stage configuration as needed, and outputs from at least two of said second clock drivers located at a central position in each divided regions are short-circuited in a form of a ring.

5. The semiconductor integrated circuit device according to claim 1, wherein the central position of the clock buffer and clock input pad is at the center of gravity of input loads of circuits which are to be synchronously controlled.

6. The semiconductor integrated circuit device according to claim 1, wherein the central position of the clock buffer and clock input pad is the center of the semiconductor integrated circuit device.

* * * * *